United States Patent
Ohno et al.

(10) Patent No.: US 6,809,147 B1
(45) Date of Patent: Oct. 26, 2004

(54) THERMOSETTING COMPOSITION

(75) Inventors: Hitoshi Ohno, Osaka (JP); Kenta Nakayama, Takatsuki (JP); Takashi Minamihori, Takatsuki (JP)

(73) Assignees: Sunstar Giken Kabushiki Kaisha, Osaka-fu (JP); Sunstar Suisse SA, Ecublens (CH)

( * ) Notice: Subject to any disclaimer, the term of this patent is extended or adjusted under 35 U.S.C. 154(b) by 0 days.

(21) Appl. No.: 10/275,002

(22) PCT Filed: May 16, 2000

(86) PCT No.: PCT/JP00/03120

§ 371 (c)(1),
(2), (4) Date: Oct. 31, 2002

(87) PCT Pub. No.: WO01/88009

PCT Pub. Date: Nov. 22, 2001

(51) Int. Cl.$^7$ .............. C08J 3/00; C08K 3/20; C08L 75/00; C08L 73/00; C08L 77/00
(52) U.S. Cl. .............. 524/507; 523/400; 524/508; 524/514; 524/538; 524/540; 525/64; 525/65; 525/66; 525/68; 525/69; 525/124; 525/454; 525/455; 525/902
(58) Field of Search ................ 524/507, 508, 524/514, 538, 540; 523/400; 525/64, 65, 66, 68, 69, 124, 454, 455, 902

(56) References Cited

U.S. PATENT DOCUMENTS 5,155,154 A   10/1992   Krummel et al. .......... 524/114
5,453,458 A * 9/1995   Takeuchi et al. .......... 523/201

FOREIGN PATENT DOCUMENTS

| JP | 55-118948 | 9/1980 |
|---|---|---|
| JP | 59-78279 | 5/1984 |
| JP | 59-120651 | 7/1984 |
| JP | 2-86641 | 3/1990 |
| JP | 8-295850 | 11/1996 |
| JP | 9-31412 | 2/1997 |
| JP | 10-168266 | 6/1998 |

* cited by examiner

*Primary Examiner*—Patrick D. Niland
(74) *Attorney, Agent, or Firm*—Jacobson Holman PLLC

(57) ABSTRACT

The present invention provides a thermosetting composition which is excellent especially in storage stability and solid physical properties and can be used as automotive body sealers or undercoats.

The thermosetting composition according to the present invention comprises an acrylic plastisol consisting of a plasticizer having acrylic resin particles having a gradient-type structure in which the monomer unit proportion changes from the core to the shell multistep-wise or continuously and a filler dispersed therein and therewith formulated, as a thermosetting material, a blocked urethane prepolymer or blocked polyisocyanate compound and a latent curing agent therefor.

6 Claims, No Drawings

THERMOSETTING COMPOSITION

This is a nationalization of PCT/JP01/03120, filed May 16, 2000 and published in Japanese.

TECHNICAL FIELD

The present invention relates to a thermosetting composition, and more particularly a thermosetting composition which comprises an acrylic plastisol of acrylic resin particles having a gradient-type structure having a certain thermosetting material formulated therein and thereby has enhanced storage stability and solid physical properties (elongation, strength) and is useful as, such as, automotive body sealers or undercoats.

BACKGROUND ART

In the prior art, polyvinyl chloride (PVC) plastisols comprising a plasticizer having PVC particles dispersed therein have been utilized in various fields, since they have excellent storage stability (particularly viscosity stability) and solid physical properties and any plasticizer of which rarely bleeds. However, since a generation of hydrogen chloride gas due to PVC at incinerating brings a destruction of ozon layer, a cause of acid rain, a cause of dioxin, etc., it has been growing strong that PVC plastisols are replaced by acrylic plastisols comprising a plasticizer having acrylic resin particles and a filler dispersed therein.

However, the prior acrylic plastisols are likely to be affected by the type of plasticizer to be used and thus cannot be compatible with development of sufficient solid physical properties by heating gelation and storage stability (particularly viscosity stability) at paste state. Further, when a cheap and all-purpose plasticizer (e.g., diisononyl phthalate) is used, the plasticizer may easily bleed since sufficient gelation cannot be obtained by heating, which may result in a surface contamination or inferior appearance.

So, there has been suggested an acrylic plastisol using acrylic resin particles having a gradient-type structure, that is, in which the monomer unit proportion changes from the core to the shell multistep-wise or continuously (gradient-type acrylic resin particles), which may prevent a plasticizer bleeding with sufficient solid (gelation) properties, even if an all-purpose plasticizer is used; and which aims at a progress of solid physical properties (see Japanese Patent Laid-Open Publication No. 295850/1996).

This acrylic plastisol using the gradient-type acrylic resin particles bears comparison with the prior PVC plastisols in the points of solid physical properties and prevention of a plasticizer bleeding after gelation; and can be said to have fully a value as a replacement, but in case of supposing such as an application to a body sealer used for a connecting part or gap part in automotive assembly line, it is necessary to change the type of plasticizer and/or to increase the amount of the gradient-type acrylic resin particles in order to obtain sufficiently satisfactory physical properties of sealant for attaining an original air- and water-tight sealing, which may be deteriorated the storage stability and increased the viscosity, which be effected the workability.

DISCLOSURE OF INVENTION

When the present inventors made intense studies for the purpose of modifying the physical properties of an acrylic plastisol using such gradient-type acrylic resin particles, they found that if said acrylic plastisol is formulated with an polyisocyanate component wherein free isocyanate group(s) (NCO) has been blocked and a latent curing agent therefor as a thermosetting material, the physical properties of their expected objective are more improved without deterioration of storage stability, that is, the physical properties can be designed to tough strength and excellent elongation and include excellent adhesion to a painted plate or a metal surface, and hence, they completed the present invention.

Thus, according to the present invention there is provided a thermosetting composition which comprises an acrylic plastisol consisting of a plasticizer having acrylic resin particles having a gradient-type structure in which the monomer unit proportion changes from the core to the shell multistep-wise or continuously and a filler dispersed therein and therewith formulated, as thermosetting material, a blocked urethane prepolymer wherein free NCO groups of a terminal NCO-containing urethane prepolymer have been blocked or a blocked polyisocyanate compound and a latent curing agent therefor.

The above-described gradient-type acrylic resin particles in the present invention contain, as monomer unit, at least one selected from ethyl methacrylate, n-butyl methacrylate, i-butyl methacrylate, sec-butyl methacrylate, t-butyl methacrylate, ethylhexyl methacrylate, ethyl acrylate, n-butyl acrylate, sec-butyl acrylate and t-butyl acrylate [hereinafter referred to as "A monomer"]; and a mixture of at least one selected from methyl methacrylate and benzyl methacrylate with at least one selected from methacrylic acid, acrylic acid, itaconic acid and crotonic acid [hereinafter referred to as "mixture B monomer"]. Such gradient-type acrylic resin particles can be produced by polymerizing A monomer (described above) and mixture B monomer (also described above) while changing the ratio (proportion) of the former to the latter multistep-wise or continuously. In this case, the proportion of A monomer will be gradually reduced from the core toward the shell, while that of mixture B monomer will be gradually increased from the core toward the shell. Typically, one may use an acrylic resin particle having an average molecular weight of 1,000–2,000,000 and a particle diameter of the primary particle and/or the secondary particle (which consists of aggregated primary particle) of 0.1–100 μm. For example, "DIANAL" which is commercially available from Mitsubishi Rayon Co., Ltd. is known.

Examples of filler in the present invention include, for example, clay, calcium carbonate (e.g., heavy-duty calcium carbonate, precipitated calcium carbonate, surface treated calcium carbonate, etc.), magnesium carbonate, titanium oxide, calcined plaster, barium sulfate, zinc white, silicic acid, mica powder, talc, bentonite, silica, glass powder, red iron oxide, carbon black, graphite powder, alumina, silas balloon, ceramic balloon, glass balloon, plastic balloon, metal powder, and the like.

Examples of plasticizer in the present invention include, for example, phthalate ester such as di(2-ethylhexyl) phthalate, butyl benzyl phthalate (high polar plasticizer), dinonyl phthalate, diisononyl phthalate, diisodecyl phthalate, diundecyl phthalate, diheptyl phthalate, butyl phthalyl butyl glycolate; aliphatic dibasic acid ester such as dioctyl adipate, didecyl adipate, dioctyl sebacate; polyglycol benzoate such as polyoxyethylene glycol dibenzoate, polyoxypropylene glycol dibenzoate; trimellitate; pyromellitic acid ester; phosphates such as tributyl phosphate, tricresyl phosphate; hydrocarbons such as alkyl-substituted diphenyl, alkyl-substituted terphenyl, partially hydrogenated alkyl terphenyl, aromatic process oil, pine oil; and the like. One or admixture of two or more selected from the group consisting of these plasticizers may be suitably selected and used depending on the type of the gradient-type acrylic resin particle. Particularly, diisononylphthalate which is inexpensive and for all-purpose can be used.

Examples of blocked urethane prepolymer in the present invention can be prepared according to the following procedure:

i) First, polyol is allowed to react with an excess amount of polyisocyanate compound to obtain terminal NCO-containing urethane prepolymer.

Examples of polyol include, for example, polyether polyol including polyoxyalkylene polyol (PPG), modified polyether polyol, polytetramethylene ether glycol; polyester polyol including condensation polyester polyol, lactone polyester polyol, polycarbonate diol; polybutadiene polyol; polyolefin polyol; polymer polyol obtained by polymerizing or graft-polymerizing acrylonitrile alone or a mixture monomer of acrylonitrile with at least one selected from the group consisting of styrene, acrylamide, acrylic ester, methacrylic ester and vinyl acetate; and the like.

Examples of the above-described polyisocyanate compound include trimethylene diisocyanate, tetramethylene diisocyanate, hexamethylene diisocyanate, pentamethylene diisocyanate, 2,4,4- or 2,2,4-trimethyl hexamethylene diisocyanate, dodecamethylene diisocyanate, 1,3-cyclopentane diisocyanate, 1,6-hexane diisocyanate (HDI), 1,4-cyclohexane diisocyanate, 1,3-cyclohexane diisocyanate, 4,4'-methylene bis(cyclohexyl isocyanate), 4,4'-methylene bis(cyclohexyl isocyanate), methyl 2,4-cyclohexane diisocyanate, methyl 2,6-cyclohexane diisocyanate, 1,4-bis(isocyanate methyl) cyclohexane, 1,3-bis (isocyanate methyl) cyclohexane, m-phenylene diisocyanate, p-phenylene diisocyanate, 4,4'-diphenyl diisocyanate, 1,5-naphthalene diisocyanate, 4,4'-diphenyl methane diisocyanate (MDI), crude MDI, 2,4- or 2,6-tolylene diisocyanate, 4,4'-toluidine diisocyanate, dianidine diisocyanate, 4,4'-diphenyl ether diisocyanate, 1,3- or 1,4-xylylene diisocyanate, ω, ω'-diisocyanate-1,4-diethylbenzene, etc.

ii) Next, the terminal NCO-containing urethane prepolymer is allowed to react with a suitable blocking agent (typically at 0.9–1.5 equivalent of the blocking agent to 1 mol NCO of the former) for blocking free NCO groups, thereby obtaining an objective blocked urethane prepolymer (it is particularly preferred to include said polymer polyol in at least one part of said polyol).

Examples of blocking agent include, for example, alcohol such as methanol, ethanol, propanol, butanol, isobutanol; phenols such as phenol, cresol, xylenol, p-nitrophenol, alkylphenol; active methylene compounds such as methyl malonate, ethyl malonate, dimethyl malonate, diethyl malonate, ethyl acetoacetate, methyl acetoacetate, acetylacetone; acid amides such as acetamide, acrylamide, acetanilide; acid imide such as succinic acid imide, maleic acid imide; imidazoles such as 2-ethyl imidazole, 2-ethyl-4-methyl imidazole; lactams such as 2-pyrrolidone, ε-caprolactam; oximes of ketone or aldehyde such as acetoxime, methyl ethyl ketoxime, cyclohexanone oxime, acetaldoxime; and others: ethyleneimine, bisulfite, etc.

A blocked polyisocyanate compound which may be used as polyisocyanate component in place of the above-described blocked urethane prepolymer in the present invention, can be obtained by blocking the free NCO groups in the polyisocyanate compound exemplified in the preparation of said terminal NCO-containing urethane prepolymer with said blocking agent.

The above-described gradient-type acrylic resin particles and the blocked urethane prepolymer or blocked polyisocyanate compound (polyisocyanate component) may be typically used at a weight ratio of 20/1-1/20, and preferably 15/1-1/2. A smaller amount than the lower limit of the latter, polyisocyanate component may provide very little additional effect (improvement effect of elongation, strength), while a larger amount than the upper limit may effect workability.

Any latent curing agent can be used in the present invention which may be activated at a temperature of 60° C. or higher (preferably 70–200° C.) to react with NCO, including, for example, dihydrazide compound such as adipic acid dihydrazide, sebacic acid dihydrazide, isophthalic acid dihydrazide, 1,3-bis(hydrazino carboethyl)-5-isopropyl hydantoin, eicosane diacid dihydrazide, hydroquinone diglycolic acid dihydrazide, resorcinol diglycolic acid dihydrazide, 4,4'-ethylidene bisphenol diglycolic acid dihydrazide; dicyandiamide; 4,4'-diamino diphenyl sulfone; imidazole compounds such as imidazole, 2-n-heptane decyl imidazole; melamine; benzoguanamine; N,N'-dialkyl urea compound; N,N'-dialkylthio urea compound; and polyamines which has a melting point of 60° C. or higher and is present in a solid form at room temperature, such as diamino diphenylmethane, diamino biphenyl, diamino phenyl, phenylenediamine, tolylenediamine, dodecane diamine, decane diamine, octane diamine, tetradecane diamine, hexadecane diamine, hydrazide polyamine.

In addition, one or more latent curing agents of the following groups (A), (B) and (C): can also be used.

(A) aliphatic polyamines such as ethylenediamine, diethylenetriamine, hexamethylenediamine, triethylenetetramine, polyoxypropylene amine; aromatic or cycloaliphatic polyamines such as m-xylylene diamine, hexamethylene tetramine, isophorone diamine; polyamine adduct such as triethanolamine, isopropanolamine, diethanolamine, diisopropanolamine, N,N,N',N'-tetra(β-hydroxyethyl)ethyleneamine, N,N,N',N'-tetra(β-hydroxypropyl)ethylenediamine, N,N,N'-tri(β-hydroxyethyl) ethylenediamine, N,N,N'-tri(β-hydroxypropyl) ethylenediamine, N,N'-di(β-hydroxyethyl) ethylenediamine N,N'-di(β-hydroxypropyl) ethylenediamine, N-(β-hydroxyethyl)ethylenediamine, N-(β-hydroxypropyl) ethylenediamine, N,N,N',N',N''-penta (β-hydroxypropyl) diethylenetriamine, N,N,N',N'-tetra(β-hydroxypropyl) diethylenetriamine, N,N,N'-tri(β-hydroxypropyl) diethylenetriamine, N,N'-di(β-hydroxypropyl) diethylenetriamine, N-(β-hydroxypropyl) diethylenetriamine, N,N,N',N',N'',N''-hexa(β-hydroxypropyl) triethylenetetramine, N,N,N',N'-tetra(β-hydroxypropyl) hexamethylenediamine, N, N'-di(β-hydroxypropyl) hexamethylenediamine, N,N,N',N'-tetra(β-hydroxypropyl)-m-xylylenediamine, N,N'-di(β-hydroxypropyl)-m-xylylenediamine, N,N,N',N'-tetra(β-hydroxypropyl) isophoronediamine, N,N,N'-tri(β-hydroxypropyl) isophoronediamine; 3,9-bis(3-aminopropyl)-2,4,8,10-tetraoxaspiro[5.5]undecane compound; polyhydroxy compounds such as ethylene glycol, diethylene glycol, triethylene glycol, dipropylene glycol, glycerin, trimethylolpropane, 1,4-butanediol, 1,6-hexanediol, 1,2,6-hexanetriol, pentaerythritol, diglycerin; and the like.

(B) polyamine modified compound, including:
  reaction products of the following (a)–(c): (a) aliphatic polyamine (such as dimethylamino propylamine, diethylamino propylamine, dipropylamino propylamine, dibutylamino propylamine, dimethylamino ethylamine, diethylamino ethylamine, dipropylamino ethylamine, dibutylamino ethylamine, trimethyl hexamethylenediamine, diaminopropane, etc.); (b) a cyclic amine or aromatic polyamine which has at least one NH₂ or NH group (for example, polyamines and monoamines such as methaxylylenediamine, 1,3-bis (aminomethyl) cyclohexane, isophorone diamine, menthane diamine, diaminocyclohexane, phenylenediamine, toluylene diamine, xylylenediamine, diamino diphenylmethane, diamino diphenyl sulfone, piperazine, N-aminoethyl piperazine, benzylamine, cyclohexylamine, etc.); and (c) diisocyanate compound (such as isophorone diisocyanate, methaxylylene diisocyanate, 1,3-bis (isocyanate methyl) cyclohexane, 2,4-toluylene diisocyanate, 2,6-toluylene diisocyanate, 1,5-naphthylene diisocyanate, 1,4-phenylene diisocyanate, diphenylmethane-4, 4'diisocyanate, 2,2'-dimethyl diphenylmethane-4,4'-diisocyanate, hexamethylene diisocyanate, trimethyl hexamethylenediisocyanate, etc.) [wherein (a)=1 mole; (b)=0.02–3 moles; and (NH₂ and/or NH contained in (a) and (b))/(NCO contained in (c)) is equal to 1/1–1.2; and reaction may be performed in a solvent such as aromatic hydrocarbon, alcohol or ketone at from room temperature to 160° C.]; and reaction products of said aliphatic polyamine (a), said amine (b) and epoxide compound (d) which includes glycidyl ether obtained by reaction of epichlorohydrin with polyhydric phenol (e.g., bisphenol A, bisphenol F, bisphenol S, hexahydrobisphenol A, catechol, resorcin, trihydroxybiphenyl, benzophenone, hydroquinone or tetramethylbisphenol A); polyglycidyl ether obtained by reaction of epichlorohydrin with aliphatic polyhydric alcohol (e.g., glycerin, neopentylglycol, ethylene glycol or polyethylene glycol); glycidyl ether ester obtained by reaction of epichlorohydrin with hydroxy carboxylic acid (e.g., p-oxy benzoic acid or oxynaphthoic acid); polyglycidyl ester derived from polycarboxylic acid such as phthalic acid, isophthalic acid, tetrahydrophthalic acid, endomethylene tetrahydrophthalic acid, trimellitic acid, polymerized fatty acid; glycidyl amino glycidyl ether derived from amino phenol or amino alkyl phenol; glycidyl amino glycidyl ester derived from aminobenzoic acid; glycidyl amine derived from aniline, toluidine, tribromoaniline, xylylene diamine or 4,4'-diamino diphenylmethane; and monoepoxide such as epoxidized polyolefin, glycidyl hydantoin, glycidyl alkyl hydantoin, triglycidyl cyanurate, butyl glycidyl ether, phenyl glycidyl ether, alkyl phenyl glycidyl ether, glycidyl benzoate ester, styrene oxide [wherein (a)=1 mole; (b)=0.5–5 moles; and (NH₂ and/or NH contained in (a) and (b))/(epoxy group contained in (d)) is equal to 1/0.3–0.9, and (NH₂ and/or NH contained in (a) and (b))/(NCO contained in (c)) is equal to 1/0.15–1.35; first, portion or all of (b) and (d) are subjected to addition reaction optionally in the above-described solvent at 60–120° C., and then (a), the reminder of (b), and (c) are added to react in the solvent at from room temperature to 160° C.]; and (C) other polyamine modified compounds, including:

those obtained by allowing an addition product of an epoxy compound (e.g., bisphenol epoxy resin, novolac epoxy resin, polyester epoxy resin or polyether epoxy resin having one or more epoxy groups in the molecule) with one or more selected from the group consisting of the above-described aliphatic polyamines, cyclic amines and aromatic polyamines to react with a phenol compound (e.g., phenol resin or resole novolac resin) and/or a polycarboxylic acid compound (e.g., adipic acid, sebacic acid, dodecanoic acid or azelaic acid) to mask the amino group to inactivation [typically, 0.7–1.5 equivalent of epoxy group in the epoxy compound is used to one equivalent of amino group in the polyamine for addition reaction, the resultant addition product (1 part by weight) is allowed to react with a phenol compound or polycarboxylic acid compound (0.04–0.5 part by weight) to mask the active amino group; the resultant reaction product is inactive at a temperature under 60° C. and will be activated at a temperature higher than 60° C., particularly 80° C. or higher].

Such a latent curing agent may be typically used at an amount of 1.0 to 3.0 equivalent to NCO of the above-described polyisocyanate component.

The thermosetting composition according to the present invention may consist of a batch mixture system comprising the above-described gradient-type acrylic resin particle, a filler, a plasticizer, an polyisocyanate component and a latent curing agent at the predetermined amounts. Optionally, a dehydrating agent (e.g., calcium oxide or molecular sieves), thixotropic agent (e.g., organic bentonite, fumed silica, aluminum stearate, metal soaps or castor oil derivatives), a stabilizer [2,6-di-t-butyl-4-methylphenol, 2,2-methylene-bis (4-methyl-6-t-butylphenol) or dibutyldithiocarbamate nickel], a catalyst (e.g., dibutyltin dilaurate, lead octylate or bismuth octylate), a solvent (high boiling hydrocarbon solvent such as naphtha or paraffin), and/or an epoxy resin may be suitably selected and added.

BEST MODES FOR CARRYING OUT THE INVENTION

Hereinafter, the present invention will be described in more detail in reference to the following Examples and Comparative Examples.

EXAMPLES 1 AND 2 AND COMPARATIVE EXAMPLES 1–5

(1) Preparation of Blocked Urethane Prepolymer No. 1

PPG (100 g) is allowed to react with MDI (27.8 g) and dibutyltin dilaurate (0.008 g) at 80° C. for 5 hours (NCO/OH=2.2) to obtain terminal NCO-containing urethane prepolymer, which is then added with methyl ethyl ketoxime (11.1 g) for reaction at 50° C. for 5 hours until the absence of NCO absorption is detected by IR. Then, a blocked urethane prepolymer is obtained. No. 2

Polymer polyol ["EL-920", available from Asahi Glass Co., Ltd; obtained by graft-polymerization of polyoxyalkylene ether polyol (molecular weight=4,900, f=3) and a mixture monomer of acrylonitrile and styrene](100 g) is allowed to react with MDI (12.3 g) and dibutyltin dilaurate (0.008 g) at 80° C. for 5 hours (NCO/OH=2.2) to obtain terminal NCO-containing urethane prepolymer which is then added with methyl ethyl ketoxime (4.9 g) for reaction at 50° C. for 5 hours until the absence of NCO absorption is detected by IR. Then, a blocked urethane prepolymer is obtained.

(2) Preparation of Body Sealer

A body sealer is obtained by mixing the components listed in Table 1 below under reduced pressure.

(3) Performance Test (Results are shown in Table 2 below)

i) Solid Physical Properties

The body sealer is coated on the substrate (coating thickness=2 mm) and baked at 140° C. for 20 minutes. Dumbbell No. 2 is used to measure elongation (%) and tensile strength (kg/cm$^2$) at a tension speed of 200 mm/minute.

ii) Plasticizer Bleeding After Gelation

The body sealer is coated on the substrate and baked as described in above i), and then left at 20° C. for 7 days. Bleeding of plasticizer is observed by visual check: ○ indicates no bleeding; x indicates bleeding.

iii) Viscosity Stability

After 7-day storage at 40° C., % increase in the viscosity is determined.

iv) Adhesion

The body sealer is coated (coating size: 10×100×5 mm) on an electrodeposition-coated plate (70×150×0.8 mm), baked at 140° C. for 20 minutes, and left at 20° C. for 24 hours. The failure condition of the body sealer is observed by peeling with a finger nail.

TABLE 1

|  | Examples | | Comparative Examples | | | | |
|---|---|---|---|---|---|---|---|
|  | 1 | 2 | 1 | 2 | 3 | 4 | 5 |
| Gradient-type acrylic resin particle (*1) | 112 | 112 | — | — | 112 | 135 | — |
| PVC (*2) | — | — | 112 | — | — | — | — |
| Acrylic resin particle (*3) | — | — | — | 112 | — | — | 112 |
| Calcium carbonate | 100 | 100 | 100 | 100 | 100 | 100 | 100 |
| Surface treated calcium carbonate | 90 | 90 | 90 | 90 | 90 | 90 | 90 |
| Diisononyl phthalate | 150 | 150 | 150 | 150 | 150 | 150 | 150 |
| Blocked urethane prepolymer of (1), No. 1 | 10 | — | — | — | — | — | 10 |
| Blocked urethane prepolymer of (1), No. 2 | — | 10 | — | — | — | — | — |
| Latent curing agent (*4) | 1 | 1 | — | — | — | — | 1 |
| Calcium oxide | 5 | 5 | 5 | 5 | 5 | 5 | 5 |
| Total | 468 | 468 | 457 | 457 | 457 | 480 | 468 |

(*1) "DIANAL RB2000" available from Mitsubishi Rayon Co., Ltd., A monomer: n-butyl methacrylate, a mixture B monomer: methyl methacrylate/acrylic acid, particle diameter = 30 μm
(*2) "PSH-180" available from Kaneka Corporation
(*3) "F345" available from Zeon Kasei Co., Ltd., n-butyl methacrylate/methyl methacrylate copolymer
(*4) "ADEKA Hardener EH 4070S", polyamine modified compound available from Asahi Denka Co., Ltd.

TABLE 2

|  | Examples | | Comparative Examples | | | | |
|---|---|---|---|---|---|---|---|
|  | 1 | 2 | 1 | 2 | 3 | 4 | 5 |
| i) Solid physical properties |  |  |  |  |  |  |  |
| Elongation (%) | 400 | 390 | 200 | 50 | 255 | 320 | 100 |
| Tensile strength (kg/cm²) | 18 | 24 | 15 | 6 | 10 | 14 | 8 |
| ii) Plasticizer Bleeding after gelation | ○ | ○ | ○ | x | ○ | ○ | x |
| iii) % increase in viscosity | 8 | 10 | 5 | 5 | 10 | 40 | 5 |
| iv) Adhesion electrodeposition-coated plate | cohesive failure | cohesive failure | — | — | — | — | cohesive failure |

INDUSTRIAL APPLICABILITY

The thermosetting composition according to the present invention is sufficiently adhesive to a coated surface or an electrodeposition-coated surface, and is particularly useful as a body sealer or an undercoat used in automotive assembly line. The inventive composition can also be used as a coating material or an adhesive material for various other metal plates.

What is claimed is:

1. A thermosetting composition which comprises an acrylic plastisol consisting of a plasticizer having acrylic resin particles having a gradient-type structure in which the monomer unit proportion changes from the core to the shell multistep-wise or continuously and a filler dispersed therein and therewith formulated, as a thermosetting material, a blocked urethane prepolymer wherein free isocyanate groups of a terminal isocyanate-containing urethane prepolymer have been blocked or a blocked polyisocyanate compound and a latent curing agent therefor.

2. The thermosetting composition according to claim 1 wherein as a thermosetting material, said blocked urethane prepolymer and said latent curing agent therefor are formulated.

3. The thermosetting composition according to claim 2 wherein said blocked urethane prepolymer is a block form of a terminal isocyanate-containing urethane prepolymer obtained by reaction of polyol with an excess amount of polyisocyanate compound and a polymer polyol is included in at least one part of said polyol.

4. The thermosetting composition according to claim 1 wherein said latent curing agent comprises a reaction product of an aliphatic polyamine and a cyclic amine or aromatic polyamine having at least one $NH_2$ or NH group and a diisocyanate compound.

5. The thermosetting composition according to claim 1 wherein said latent curing agent comprises those obtained by allowing an addition product of an epoxy compound and one or more selected from the group consisting of aliphatic polyamine, cyclic amine and aromatic polyamine to react with a phenol compound and/or a polycarboxylic acid compound to mask the amino group to inactivation.

6. The thermosetting composition according to claim 1 wherein the ration by weight of said acrylic resin particle having a gradient-type structure to said blocked urethane prepolymer or blocked polyisocyanate compound is 20/1-1/20.

* * * * *